United States Patent [19]

Konno et al.

[11] Patent Number: 4,847,730
[45] Date of Patent: Jul. 11, 1989

[54] COMPOSITE-TYPE CIRCUIT COMPONENT AND ITS MANUFACTURING METHOD

[75] Inventors: Tadashige Konno; Koji Nishida; Makoto Saitoh, all of Tokyo, Japan

[73] Assignee: TDK Corporation, Tokyo, Japan

[21] Appl. No.: 167,215

[22] Filed: Mar. 11, 1988

[51] Int. Cl.⁴ .......................... H01G 1/14; H03H 7/00
[52] U.S. Cl. ..................................... 361/306; 333/181
[58] Field of Search ............... 336/192, 105; 29/25.42; 333/181, 153; 330/251; 361/306

[56] References Cited

U.S. PATENT DOCUMENTS

| | | | |
|---|---|---|---|
| 4,345,231 | 8/1982 | Cline et al. | 336/192 |
| 4,384,263 | 5/1983 | Neuman et al. | 333/181 |
| 4,427,955 | 1/1984 | Roberts | 333/181 X |
| 4,563,659 | 1/1986 | Sakamoto | 333/181 |
| 4,752,752 | 6/1988 | Okubo | 333/181 |

Primary Examiner—Donald A. Griffin
Attorney, Agent, or Firm—Armstrong, Nikaido, Marmelstein, Kubovcik & Murray

[57] ABSTRACT

The present invention relates to a composite-type circuit component containing inductors and a capacitor, in which the inductors are disposed at both wings of a conductive plate, and the capacitor is disposed at the intermediate portion of the conductive plate. The above-mentioned inductors and capacitor are connected with lead wires having circular cross sections.

6 Claims, 4 Drawing Sheets

COMPOSITE-TYPE CIRCUIT COMPONENT AND ITS MANUFACTURING METHOD

BACKGROUND OF THE INVENTION

The present invention relates to a composite-type circuit component comprising capacitors, inductors, and the like and its manufacturing method.

There has been provided a composite-type circuit component of a module-type which constitutes a noise filter by using capacitors and inductors.

Such a module-type noise filter and its manufacturing method will be described with reference to FIG. 6.

A lead frame 1 shown in FIG. 6 is formed by, for instance, pressing a metal plate (conductive member). In the same diagram, numerals 2 and 3 represent capacitor mounting portions, and numerals 4 and 5 represent core mounting portions. Next, a capacitor (chip capacitor), that is, an electric circuit element 6 is soldered to the above-mentioned capacitor mounting portions 2 and 3, and cylindrical cores 7 and 8 are fitted into the core mounting portions 4 and 5, respectively. The cylindrical cores 7 and 8 are made by forming magnetic material into a cylindrical shape and called "a beads core". The capacitor 6 and the cylindrical core mounting portions 4 and 5 are molded with resin or the like. After that, cutting of a CUT portion allows a mold-type noise filter NF to be obtained. The obtained mold-type noise filter NF has an equivalent circuit as shown in FIG. 8. In other words, in FIG. 8, C corresponds to the capacitor 6, and $L_1$ and $L_2$ are inductors formed by fitting the cylindrical cores 7 and 8 to the core mounting portions.

The mold-type noise filter NF is mounted on a part mounting substrate (hereinafter, simply called as a substrate) PCB on which conductive patterns 9 are formed beforehand as shown in FIG. 7. This practical mounting is performed by, after inserting lead-out wires 10, 11, and 12 of the mold-type noise filter NF into part mounting holes bored through the part mounting substrate PCB and bending the lead-out wires 10, 11, and 12 in the designated direction, arranging them in the definite length and piling up solder 13 on their bent portions.

The above-mentioned conventional composite-type circuit component is, however, provided with the following defects.

Firstly, the lead-wire itself becomes flat also in order to form the lead frame. Accordingly, when the above-mentioned lead-out wires are inserted into the part mounting holes bored through the part mounting substrate PCB, they can not be automatically inserted because of irregularity in their shape.

Secondly, since the above-mentioned lead-out wires are flat in shape and, therefore, are provided with a different section modulus dependent on the bending direction, the direction of each of the lead-out wires is limited, so that it is subjected to limitation in design. Furthermore, when the above-mentioned leadout wires are loaded on other part mounting substrates, using, for example, an automatic insertion machine and the like, they are difficult to handle.

Thirdly, as disclosed in the Utility Model Disclosure Publication No. 101820/1985, formerly, the above-mentioned cylindrical cores had to be inserted from the lower portions of the lead-out wires formed integrally with the flat lead frame, as shown in the figure. Therefore, the tips of the above-mentioned lead-out wires were applied with a force in the direction substantially perpendicular to the paper surface to give thereto elastic deformation, so to speak, the abovementioned cylindrical cores are forcibly inserted into the core mounting portions.

As stated above in detail, in the conventional composite-type circuit component, firstly, the lead-out wires themselves are made flat for forming the lead frame. Accordingly, when the above-mentioned lead-out wires are inserted into the part mounting holes bored through the part mounting substrate PCB, the lead wires cannot be inserted automatically because of irregularity in their shape. Secondly, since the above-mentioned lead-out wires are flat, and therefore, provided with a different section modulus dependent on the bending direction, the direction of each of the lead-out wires is limited and subjected to limitation in design. When the above-mentioned flat lead wires are loaded on other part mounting substrates using, for example, an automatic insertion machine and the like, they are difficult to handle. Thirdly, as disclosed in Utility Model Publication No. 101820/1985, formerly, there were following problems. That is, the above-mentioned cylindrical cores had to be inserted from the lower portions of the lead-out wires formed integrally with the flat lead frame as shown in the figure, and therefore, the tips of the above-mentioned lead-out wires were applied with a force in the direction substantially perpendicular to the paper surface to give thereto elastic deformation, so to speak, the abovementioned cylindrical cores are forcibly inserted into the core mounting portions.

SUMMARY OF THE INVENTION

The present invention is devised in consideration of the above-mentioned reasons, and its object is to provide a composite-type circuit component convenient for handling and mounting thereof by eliminating defects of the flat lead wires.

A constitution of the present invention for accomplishing the above-mentioned object is as follows. A composite-type circuit component in which lead wires are respectively connected with both wing portions of a conductive plate having coupled wing portions. Cores for inductors are mounted on the lead wires, a capacitor is provided at the above-mentioned coupled portion of the conductive plate, and one of the lead wires is connected with the capacitor via its electrode section each of the above-mentioned lead wires is constituted by conductive members having a circular sectional shape, and at the same time, lead wire coupling portions are provided at the above-mentioned both wing portions and the electrode section of the capacitor, respectively.

Another constitution of the present invention for accomplishing the above-mentioned object is as follows.

The composite-type circuit component is provided with coupled wings, a conductive plate having lead wire coupling portions at the wings, round lead wires coupled and connected with the respective lead wire coupling portions of the conductive plate, cylindrical cores inserted and arranged into the respective round lead wires, and a capacitor loaded between an intermediate coupling portion of the above-mentioned conductive plate and an electrode section disposed at the position apart from the intermediate coupling portion and connected with the both of them other respective members, except the above-mentioned round lead wires and one part of the tips of the cylindrical cores, are molded.

A further constitution of the present invention is a manufacturing method for the compositetype circuit component by comprising a process for disposing a plurality of round lead wires at the designated interval and transferring thereof, a process for fitting cylindrical cores into each one end of two lead wires on both ends among adjacent three round lead wires, a process for connecting a substantially T-shaped conductive plate provided with lead wire coupling portions at its wings and its leg to the above-mentioned three lead wires, a process for cutting the leg of the T-shaped conductive plate, the leg being connected to a middle lead wire among the above-mentioned three lead wires, a process for loading a capacitor on the divided sections of the leg so as to bridge them and connecting the capacitor to the divided sections, a process for molding other respective members except exposed portions of the round lead wires and the ends of the cylindrical cores with the cylindrical cores and the capacitors held in parallel with each other.

The effect of the present invention having the above-mentioned constitutions is that since the round lead wires are employed as the lead wires, the composite-type circuit component is easy to handle, and at the same time, defects of flat lead wires are eliminated. In this way, a composite-type circuit component is easily mounted on other circuit substrates.

DESCRIPTION OF THE PREFERRED EMBODIMENT

Hereinafter, there will be given a description of an embodiment according to the present invention with reference to diagrams.

Figure 1:
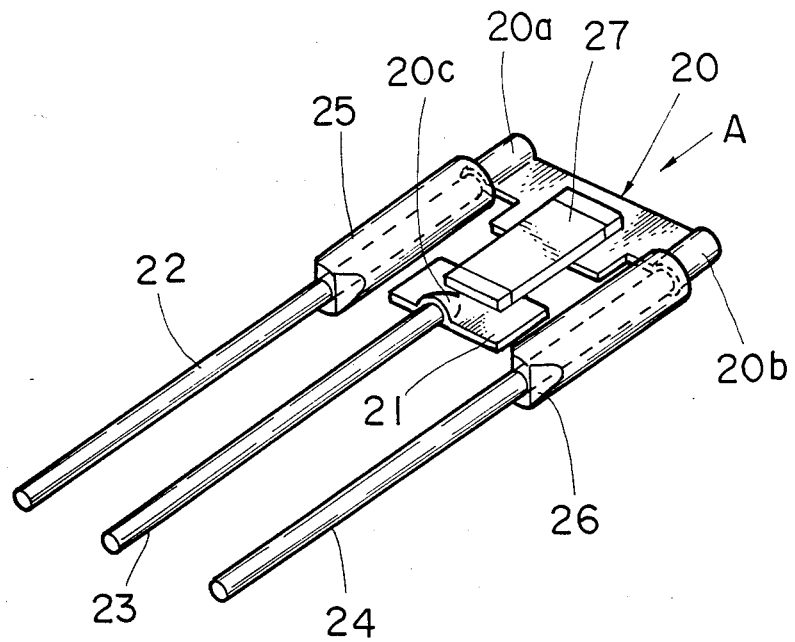
FIG. 1 is a perspective view of appearance of a composite-type circuit component according to the present invention.

In FIG. 1, a composite-type circuit component has lead wire coupling depressions 20a to 20c formed so as to make the round wires adhere thereto by making thereof correspond to the figure of each of the tips of the round wires described later the circuit comprises a substantially T-shaped conductive plate 20, three round-shaped lead wires 22 to 24, for example, of which one ends adhere to the above-mentioned lead wire coupling depressions 20a to 20c, bead cores 25 and 26 which are disposed near portions adhering to the round lead wires 22 to 24 and the above-mentioned conductive plate 20 and fitted so as to be inserted onto the above-mentioned round-shaped lead wires a chip capacitor 27 is loaded on the above-mentioned conductive plate 20 and conductively connected thereto.

In this way, in the present invention, if the connection of each round lead wire to the conductive plate 20 or a leg cut-off 21 and that of the chip capacitor 27 to the conductive plate 20 or the leg cut-off 21 are made by two kinds of solder having different melting points respectively, when the circuit element on one side is being connected to the conductive plate 20, the solder at the connecting portion of the circuit element on the other side is not melted by heat generated at that time. Furthermore, since the lead wire coupling depressions 20a to 20c formed so as to make thereof correspond to the shape of each of the tips of the round lead wires as described above and make the round lead wires adhere thereto are provided, it is possible to easily perform positioning of the abovementioned round lead wires when they are made to adhere to the depressions.

Further, the leg cut-off 21 is formed by cutting the one end of the conductive plate 20 having the above-mentioned rough T-shaped at the stage of its manufacturing process.

Figure 2:
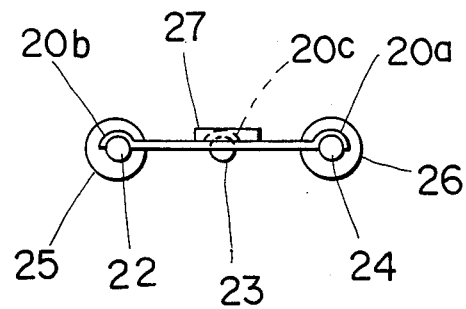
FIG. 2 is a fragmentary view seen from the direction of an ,arrow A in FIG. 1.

FIG. 2 is an arrow diagram seen from the direction of an arrow A shown in the above-mentioned FIG. 1.

As shown in the same diagram, the shapes of the sections of the above-mentioned three round lead wires 22 to 24 are circular. The portions extending over the substantial semicircumferences of the sides of the sections are made respectively to adhere to the respective lead wire coupling depressions provided on the respective tips of the above-mentioned conductive plate 20 and the lead wire coupling depression provided on the cut-off 21 and arranged in the same plane as the plane containing the respective flat portions of the above-mentioned conductive plate and the cut-off. In this way, since the sectional shapes of the three round lead wires are all made circular, these round lead wires can be easily chucked, and at the same time, their positioning in loading them on other substrates can be easily done. Furthermore, in the present invention, the sectional shapes of the round lead wires are made circular as described above, and the strength of the lead wires dependent on the direction of bending is made constant, it is easy to bend the lead wires in an arbitrary direction, and the lead wires do not cause a limiting factor in design.

The above-mentioned beads cores 25 and 26 are made of, for example, ferrite material in the same way as before and formed via processes of press molding, calcining, and the like. The present embodiment has end faces composed of two inclined planes intersecting at both ends of the end faces, respectively. In this way, the inclined planes shown in the diagram are provided at the both ends of the end faces in order to form air gaps in solder when the LC composite - type component is inserted onto the circuit substrate for soldering. Accordingly, if the above-mentioned problem is not present in insertion and mounting of the composite component onto and on the substrate, the inclined planes need not be provided.

The manufacturing processes for the embodiment of the composite-type circuit component constituted as above-mentioned will be described with reference to FIG. 3A to FIG. 3F.

① The above-mentioned lead wire coupling depressions 20a to 20c are formed on the both wing ends and the respective ends of the cut-off of the substantially T-shaped conductive plate (supporting member) 20. (Refer to FIG. 3A and FIG. 3B.)

Figure 3A:
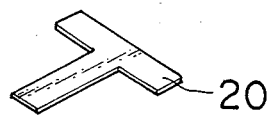
FIG. 3 A, B, C, D, E, and F are views explanatory of manufacturing processes.
Figure 3B:
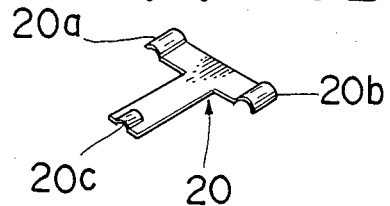
Figure 3C:
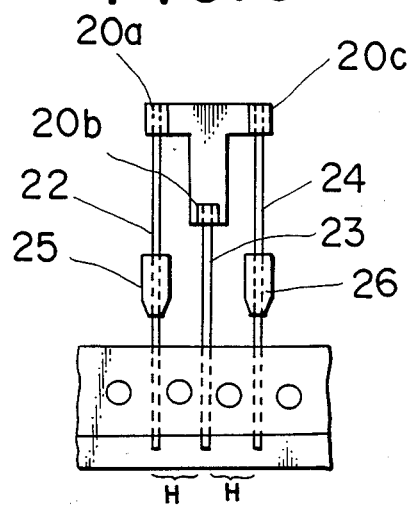
Figure 3D:
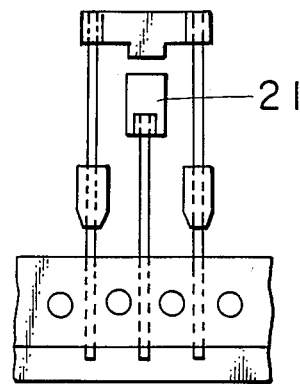
Figure 3E:
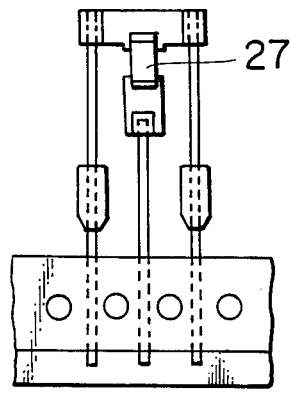
Figure 3F:
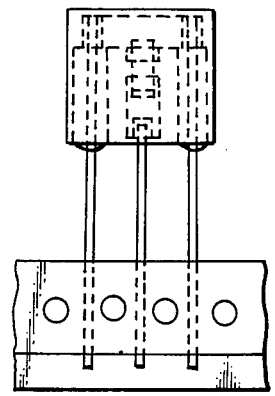

② The beads cores 25 and 26 are inserted onto the round lead wires 22 and 24. At this time, a plurality of the round lead wires are fixed to, for example, a transfer belt made of paper while keeping, for example, the designated interval H as shown in FIG. 3C, and transferred using holes provided in the same belt at a certain interval using, for example, a sprocket or the like. One end of each round lead wire is made to adhere to each of the above-mentioned lead wire coupling depressions by solder having its melting point at a relatively high temperature. (Refer to FIG. 3C.)

In this way, in the present invention, the beads cores 25 and 26 can be easily inserted onto the round lead wires 22 and 24 from the upper part shown in the figure. Furthermore, since the lead wire coupling depressions 20a and 20c are formed on the conductive plate, the positioning and the dimensional accuracy of the lead wires can be repeatedly and satisfactorily reproduced. Accordingly, when the above-mentioned round lead wires are inserted into insertion holes formed on the substrate PCB correspondingly thereto, they can be easily inserted. In addition, since the sectional shape of the lead wire is different from that of a conventional lead wire and it is circular in the present embodiment, the round lead wires can be easily inserted into the insertion holes formed on the substrate PCB correspondingly thereto.

③ The above-mentioned T-shaped conductive plate 20 is cut at its central portion (the leg cut-off 21). In this case, one end of the leg cut-off 21 is being fixed by the round lead wire 23. (Refer to FIG. 3D.)

④ The chip capacitor 17 is conductively connected to the portion which has been cut in the above-mentioned ③, that is, the leg cut-off 21 by solder having its melting point at a lower temperature than that of solder described above. (Refer to FIG. 3E.)

⑤ The beads cores which have been already inserted are made to move near the connecting portion between the conductive plate 20 and the round lead wires, and the circuit elements around are molded. At this time, the lower ends of the above-mentioned beads cores shown in the diagram and the exposed portions of the round lead wires are made to project out of the mold. (Refer to FIG. 3F.) In this way, in the present invention, the automatic framework can be carried out without using a lead frame as before.

Figure 4A:
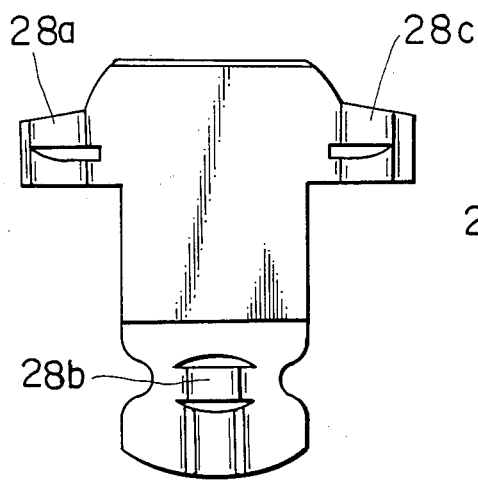
FIG. 4 A and B are a plan view and a front view of a first modified example of a conductive plate (supporting member) respectively.
Figure 4B:
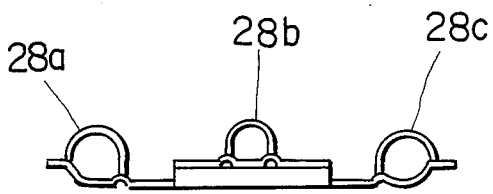

FIG. 4A and FIG. 4B are a plan view and a front view of a first modified example of the conductive plate (supporting member), respectively.

The point of difference between the conductive plate shown in the same figure and that shown in FIG. 1 is as follows. The coupling portions for the lead wires formed on the conductive plate (supporting member) shown in FIG. 1, that is, the lead wire coupling depressions 20a to 20c have the sectional shape of a semicircumference, but in the present embodiment, the lead wire coupling portions 28a to 28c have the shape of a cylinder. For instance, after the lead wires are inserted into the center of the lead wire coupling portions, they are pressed to deform them and then soldered.

Figure 5A:
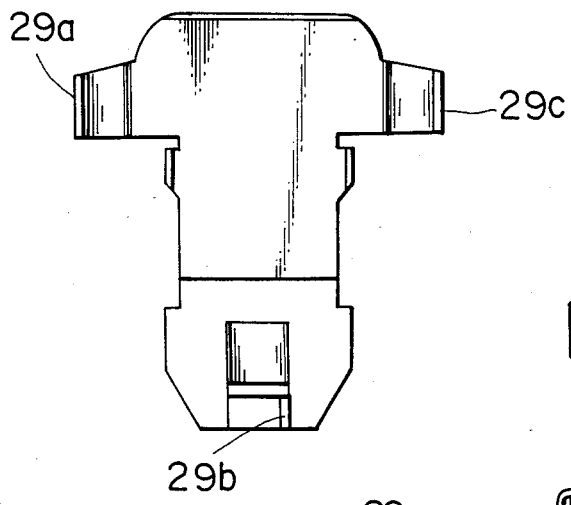
FIG. 5 A and B are a plan view and a front view of a second modified example of a conductive plate (supporting member) respectively.
Figure 5B:
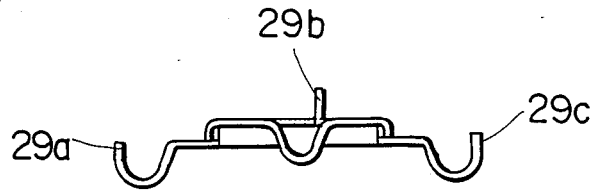
Figure 6:
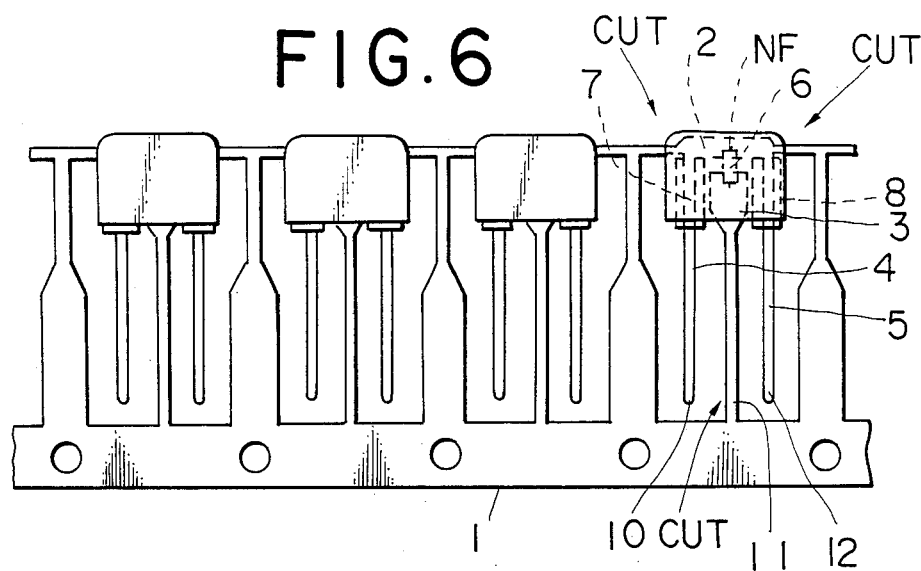
FIG. 6 is a view explanatory of manufacturing processes of a conventional composite-type circuit component.
Figure 7:
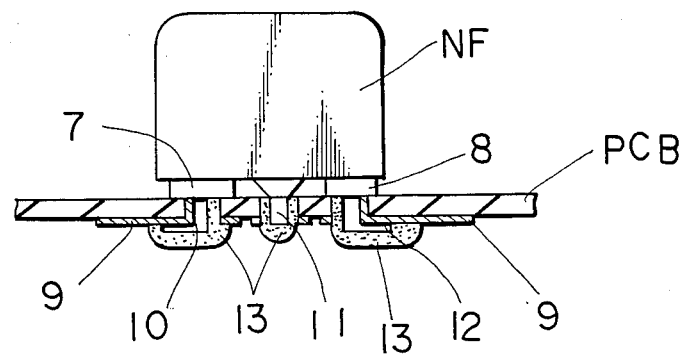
FIG. 7 is a view explanatory of mounting of a substrate of the conventional composite-type circuit component.
Figure 8:
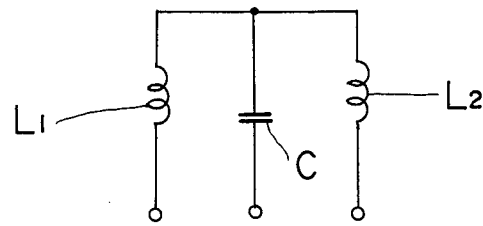
FIG. 8 is a view of an equivalent circuit of a composite-type circuit component.

FIG. 5A and FIG. 5B are a plan view and front view of a second modified example of the conductive plate (supporting member), respectively. The point of difference between the conductive plate (supporting member) shown in the same figure and that shown in FIG. 1 is as follows. The lead wire coupling depressions 20a to 20c have the sectional shape of a semicircumference, but in the present embodiment, the members 29a to 29c constituting the depressions are made to extend in the direction substantially perpendicular to flat portions of the conductive plate (supporting member) and the inserted lead wires are fixed by "caulking". After that, they are soldered. The lead wire coupling portions as shown in above-mentioned FIG. 4A and FIG. 4B, and FIG. 5A and FIG. 5B allows the coupling strength to be improved still more.

Accordingly, the manufacturing processes in the case where the conductive plate as shown in the above-mentioned FIG. 4A and FIG. 5A can adopt the following sequence.

① The beads cores 25 and 26 are inserted onto the round lead wires 22 and 24.

② The tips of the lead wires are inserted into the lead wire coupling portions 28a to 28c (29a to 29c) on the conductive plate, and the above-mentioned coupling portions are crushed to fix thereof to the conductive plate.

③ One part of the leg of the T-shaped conductive plate is cut to form a cut electrode section.

④ The above-mentioned respective lead wire coupling portions and a loading portion for the chip capacitor on the above-mentioned conductive plate are applied with creamy solder.

⑤ After solder on the above-mentioned respective lead wire coupling portion and loading portion for the chip capacitor is melted by spraying of warm air, it is cooled, and at the same time, the respective connecting portions are connected with each other.

⑥ Necessary spots in respective portions are molded.

According to such a manufacturing processes, soldering process need not be performed two times like the above-mentioned embodiment, but soldering for the whole can be performed one time, because only crushing of the lead wire coupling portions allows the lead wires to be securely fixed.

The present invention can be reduced to practice in various kinds of modifications within the scope of the gist of the invention described in the scope of the claims without restriction to the above-mentioned respective embodiments.

We claim:

1. A composite-type circuit component comprising:
   a T-shaped conductive plate having two wing portions;
   parallel lead wires lying in a common plane being connected to both wing portions of said T-shaped conductive plate, respectively, said lead wires being conductive members having a circular sectional shape;
   cores for inductors being mounted on the lead wires;
   a capacitor being provided at a coupling portion of the T-shaped conductive plate, one of the lead wires being connected to the capacitor via an electrode section, and
   lead wire coupling portions being provided at said both wing portions and said electrode section of the capacitor respectively.

2. A composite-type circuit component according to claim 1, wherein said lead wires being coupled and connected with the respective lead wire coupling portions of the T-shaped conductive plate, said cores being cylindrical, said cylindrical cores being inserted and arranged into the respective lead wires and said capacitor being loaded between an intermediate coupling portion and said electrode section disposed apart from the intermediate coupling portion and connected with both said intermediate coupling portion and said electrode section and said composite-type circuit being molded except for said lead wires and tips of said cylindrical cores.

3. A composite-type circuit component according to claim 1, wherein said lead wire coupling portions are depressions formed correspondingly to round lead wires to be connected thereto.

4. A composite-type circuit component according to claim 1, wherein said lead wire coupling portions are cylindrical portions formed correspondingly to round lead wires to be connected thereto.

5. A manufacturing method for the composite-type circuit component comprising the steps of:
- disposing and transferring a plurality of round lead wires at a designated interval;
- fitting cylindrical cores into each one end of two lead wires on both ends of three adjacent round lead wires;
- connecting a substantially T-shaped conductive plate provided with lead wire coupling portions at wing portions and a leg to the three lead wires;
- cutting the leg of the T-shaped conductive plate, the leg being connected to a middle lead wire among the three lead wires;
- loading a capacitor on the divided sections of the leg so as to bridge the sections and connecting the capacitor to the divided sections; and
- molding other respective members except exposed portions of the round lead wires and ends of the cylindrical cores, with the cylindrical cores and the capacitor held in parallel with each other.

6. A manufacturing method for the composite-type circuit component comprising the steps of:
- disposing a plurality of round lead wires at a designated interval and transferring thereof;
- fitting cylindrical cores into each one end of two lead wires on both ends of three adjacent round lead wires;
- connecting a substantially T-shaped conductive plate provided with lead wire coupling portions at wing portions and a leg to said three lead wires;
- cutting the leg of the T-shaped conductive plate, the leg being connected to a middle lead wire among said three lead wires;
- loading a capacitor on divided sections of the leg so as to bridge the sections and connecting to the divided sections using solder having a second melting point lower than a first melting point; and
- molding other respective members except exposed portions of the round lead wires and ends of the cylindrical cores, with the cylindrical cores and the capacitor held in parallel with each other.

* * * * *